United States Patent [19]

Törnblom

[11] Patent Number: 5,117,185

[45] Date of Patent: May 26, 1992

[54] TRANSFORMER-COUPLED TRANSDUCER

[75] Inventor: Bengt H. Törnblom, Västerås, Sweden

[73] Assignee: Tornbloms Kvalitetskontroll AB, Västerås, Sweden

[21] Appl. No.: 500,514

[22] Filed: Mar. 28, 1990

[30] Foreign Application Priority Data

Mar. 28, 1989 [SE] Sweden ................................ 8901054

[51] Int. Cl.$^5$ ............................................ G01R 33/00
[52] U.S. Cl. .................................................... 324/262
[58] Field of Search ............... 324/226, 224, 262, 237, 324/238, 240, 241, 242, 243; 340/870.31

[56] References Cited

U.S. PATENT DOCUMENTS 4,170,755 10/1979 Mansson .............................. 324/236

*Primary Examiner*—Walter E. Snow
*Attorney, Agent, or Firm*—Watson Cole Grindle & Watson

[57] ABSTRACT

In crack-sensing equipment for hot steel strands, a movable transducer is linked to its sensing electronic circuit via an inductive transmission link to obviate the use of flexible conductors and/or slip couplings.

9 Claims, 4 Drawing Sheets

TRANSFORMER-COUPLED TRANSDUCER

TECHNICAL FIELD

The present invention relates to monitoring equipment (e.g. for testing and/or measuring an object, for example a hot steel blank, with respect to a quantity, for example the existence of surface cracks) which comprises at least one electrical transducer (as hereafter defined) which is movable relative to a test object. The present invention thus relates generally to the fields of testing, quality sensing, and measurement. The invention is well suited for use within the field of eddy current testing, in which signal transmission to and from a moving transducer sensor often presents a problem because of high transducer speeds or a hot and hostile environment.

Prior art monitoring equipment of the kind to which this invention relates often entails the transmission of signals to and from a transducer via a galvanic connection, that is, via cables and the like electrical conductors. U.S. Pat. No. 4,734,642 describes a device for signal transmission to rotating transducers.

Throughout this specification the term "transducer" is intended to cover all variants of transducers and sensors which require an electrical connection. Further, the present invention is not limited to monitoring equipment in which the transducer performs circular surface scanning paths over the test object but also covers reciprocating scanning paths, for example where a crack-sensing transducer is running backwards and forwards across a steel blank.

SUMMARY OF THE INVENTION

Monitoring equipment according to the invention is characterized in that at least one conductor is used, for example as a sub-device, oriented along at least the main direction of movement of the transducer and inductive transmission of signals is used between the movable transducer and electronic equipment connected to said at least one conductor.

Instead of using a plurality of parallel-working, fixedly mounted, spaced-apart transducers spread out across, for example, a moving steel strand, the invention makes it possible to pave the way for a transducer with small movable mass to be used which is mounted to move rapidly across the surface of the test object. To make this possible, a simple and light-weight signal transmission system is required, which does not suffer fatigue problems and the like. In addition to this, the transmission system should be robust and resistant to the rigors of the environment of use.

BRIEF DESCRIPTION OF THE DRAWINGS

Embodiments of monitoring equipment in accordance with the invention will now be described, by way of example, with reference to the accompanying drawings, in which.

DESCRIPTION OF PREFERRED EMBODIMENTS

Figure 1:
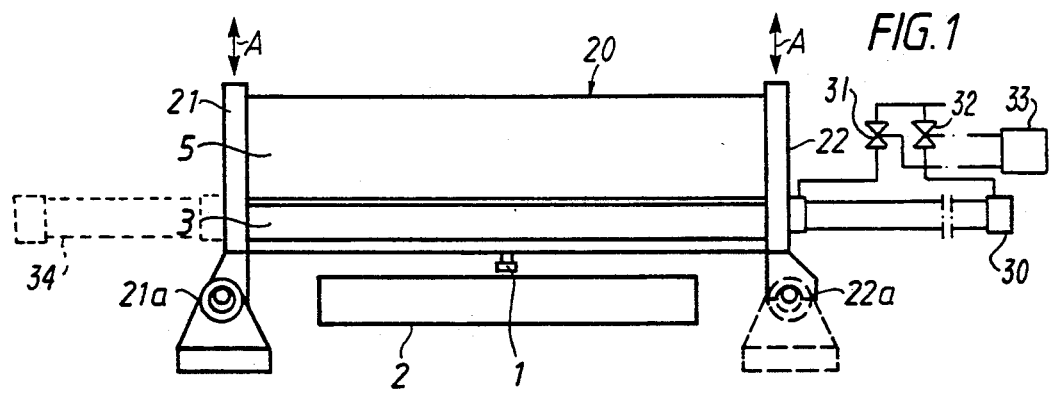
FIG. 1 shows a cross-section through a hot steel strand and an end view of a transducer manipulator with an associated transducer for sensing for cracks in the strand.

The task of a transducer manipulator 20 in equipment in accordance with this invention is to move a transducer 1 across the surface of a test object 2. The transducer 1 can be formed as part of a carriage or can be mounted on or in a carriage. The carriage is movably supported in the manipulator 20 so that it can scan across the surface of the test object 2 (which could be a moving hot steel strand). As shown in FIG. 1, the manipulator 20 comprises lower and upper chambers 3 and 5, respectively, which link end supports 21 and 22. The end supports can be moved upwards and downwards in the directions of the arrows A to adjust the vertical spacing between the transducer 1 and the object 2.

As shown in FIG. 1 eccentric supports 21a, 22a can be used to provide the vertical positional control required.

Suitable means (not shown) is provided to produce reciprocating movement of the transducer 1 across the object 2 (i.e. in the directions of the arrows B in FIG. 2) and by adjusting the extent of the reciprocal movement and its frequency relative to the speed of advance of the test object 2 (i.e. out of the plane of the paper) the extent to which the entire surface of the object 2 is scanned can be adjusted. The force for providing the aforesaid reciprocal movement of the transducer 1 across the object 2 is a conventional pneumatic cylinder 30 and a control unit 33 for actuating two valves 31, 32 supplying compressed air to the cylinder. With the transducer carriage fixed to the valve rod, the device as described may be used to move the transducer carriage in a reciprocating motion. However, if as described, infra., the shuttle principle is employed, the transducer carriage is free from the valve rod and another cylinder 34 must be adapted at the opposite end, thereby enabling the transducer carriage to reciprocate.

Figure 2:
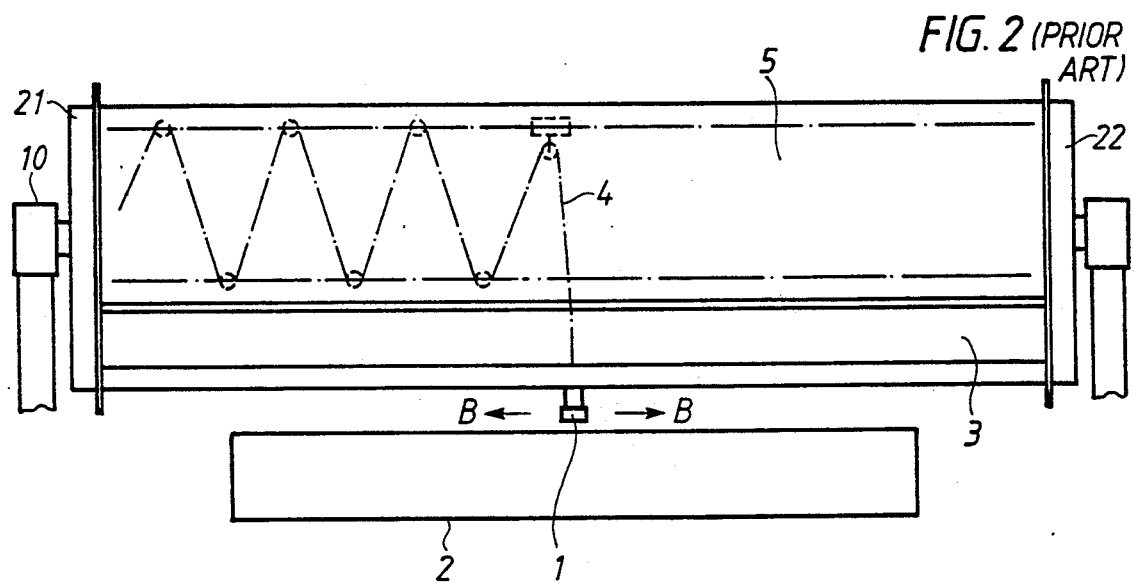
FIG. 2 is a view similar to FIG. 1 of another manipulator shown in greater detail.

FIG. 2 shows a manipulator similar to FIG. 1, with a different mode of mounting 10 for the end supports 21, 22. FIG. 2 also indicates the structure used within the chamber 5 to control the movement of a flexible conductor 4 used to feed electrical power to, and/or receive signals from, the transducer 1. FIG. 2 has been designated "Prior Art" because of the use of the flexible conductor. FIG. 1 has not been so marked because it embodies the inductive coupling to the transducer 1 which is the main feature of this invention. The lower chamber 3 will be water-cooled if the object 2 is a hot steel strand and a typical arrangement for such water cooling is to be seen in FIG. 5.

Figure 3:
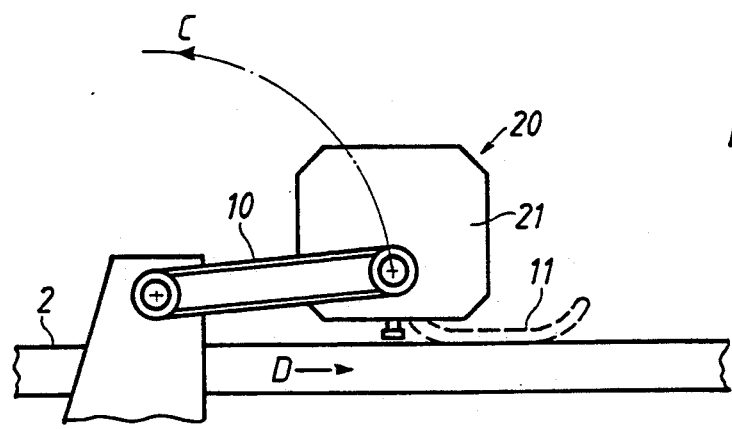
FIG. 3 is a side view of a transducer manipulator with the transducer supported above a test object.

FIG. 3 shows an end view of the manipulator mounting 10 of FIG. 2 with the transducer 1 of the manipulator 20 guided in its position of closest approach to the object 2 by a slide 11. The manipulator 20 can be lifted clear of the test object 2 by swinging the mountings 10 round in the direction of the arrow C. The direction of advance of the test object 2 is shown by the arrow D.

Figure 4:
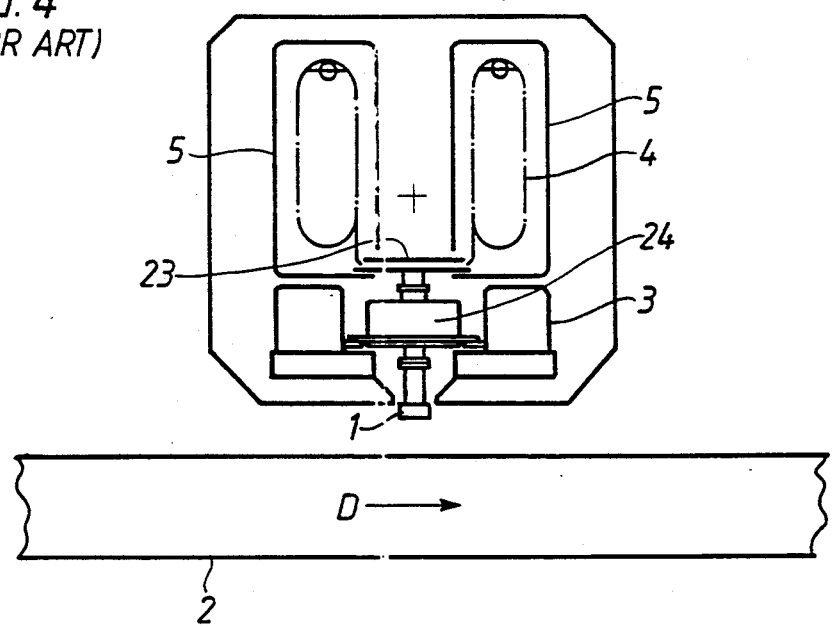
FIG. 4 is a cross-section of the manipulator of FIG. 3 on an enlarged scale.

FIG. 4 shows a sectional view of a prior art manipulator (of the kind shown in FIG. 2) where the electrical power supply to and/or from the transducer 1 is carried via a flexible cable 4 housed in one of the upper chambers 5. In FIG. 4, the mounting of the transducer 1 is as shown in greater detail in FIG. 6 and involves a rotational mounting so that the transducer 1 can spin about an axis perpendicular to the upper surface of the test object 2 over which the transducer moves. To allow for this rotation, the cable 4 leads to a slip ring or like moving contact coupling 23. In the second of the upper chambers 5 shown in FIG. 4 a flexible hose 4a is located, this feeding gas and/or liquid coolant to a lower housing 24 of the transducer 1. If rotation of the transducer 1 is not required, then the coupling 23 can be dispensed with.

Figure 5:
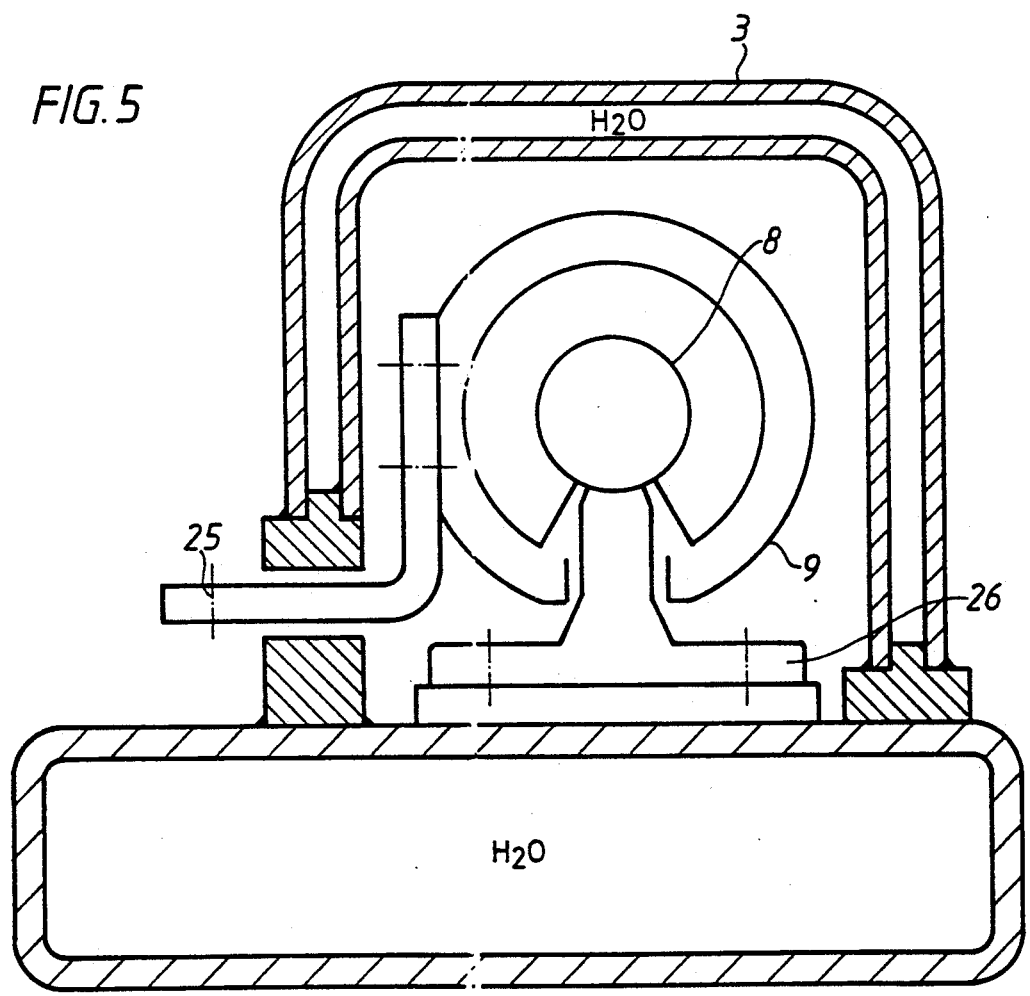
FIG. 5 shows how a transducer can be mounted in a water-cooled arrangement.

FIG. 5 shows one arrangement which can be employed in the water-cooled lower chambers 3 to support the transducer 1 for lengthwise movement along the manipulator 20. As shown here a bracket 25 is attached to ball bushings 9 surrounding a cylindrical shaft rail 8 mounted on stands 26 (only one of which is shown). The brackets 25 are also shown in FIG. 6 and support the housing 24 via flexible couplings 17.

By enclosing the bearings of the lower housing 24, which also includes any wheels and the like, in a cooled space and only allowing a bracket 25 to protrude into a gap, as shown in FIG. 5, a very robust and reliable thermally-protected design is obtained.

Figure 6:
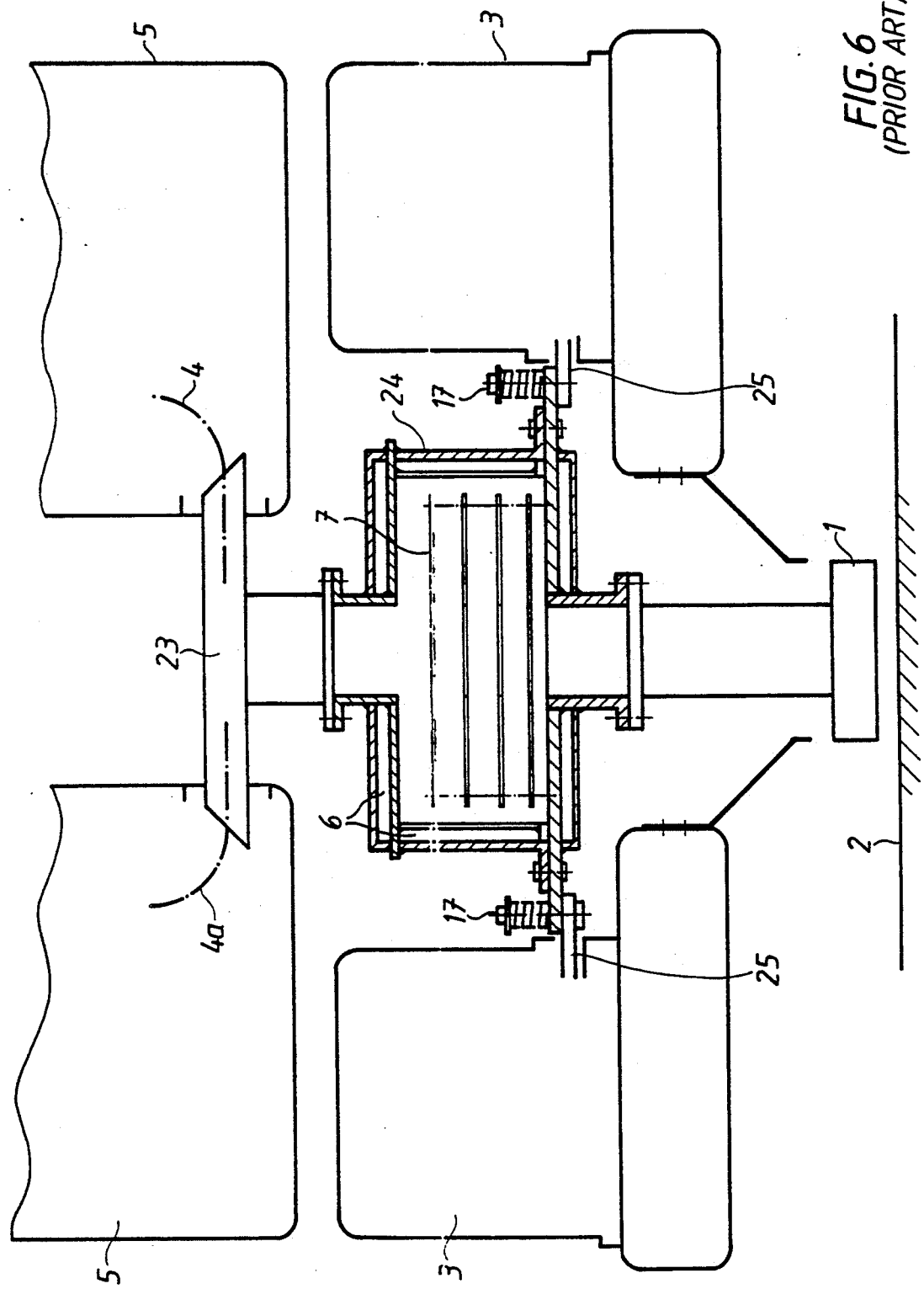
FIG. 6 shows, in more detail, how parts of the arrangement shown in FIG. 5 can be disposed.

FIG. 6 shows how, adjacent to the actual transducer 1, certain electronic equipment 7 is located. The electronic equipment is protected by double-walled, water-filled walls 6 of the lower housing 24. As will be clear, the transducer 1 is thus well protected, both mechanically and from heat radiation from the object 2 which could be a hot strand having a temperature of 900° C. The electronic equipment 7 may be on circuit boards as shown and can be of a type to electronically adapt the output signal for its passage through the coupling 23.

By placing the transducer carriage between two shaft rails 8, the carriage will have a high stability and will be able to carry large loads, for example transducer arrangements according to U.S. Pat. No. 4,767,986 and U.S. Pat. application Ser. No. 52,545, now abandoned.

Thus far an easily movable transducer has been described which with low friction is able to move rapidly, for example transverse to the direction of movement of the object 2. However, the arrangement of the cable, 4 in FIGS. 2, 4 and 6, presents a problem. A loose hanging cable tends to be subjected to mechanical fatigue and also gives rise to disturbance when using, for example, high frequencies in connection with eddy currents. A water hose 4a of, for example, polyurethane is considerably more resistant and easy to lay and is not therefore a problem.

Figures 7A, 7B:
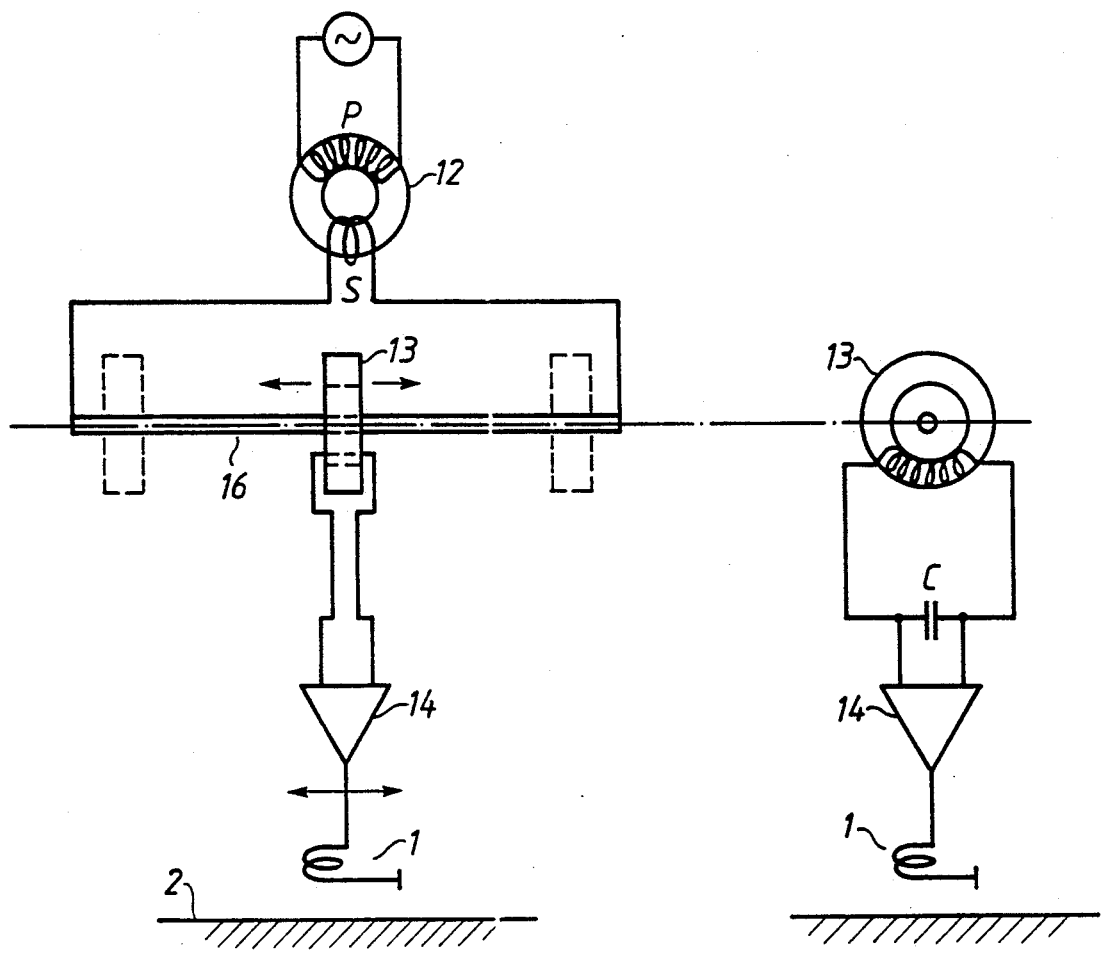
FIGS. 7A and 7B show, respectively, in schematic front and side views how, in accordance with the present invention, an inductive signal transmission link can be arranged between a transducer and a sensing circuit therefor.

This invention proposes the step of achieving signal transmission between relatively movable parts of the manipulator 20 by the use of an inductive transmission of the type shown in principle in FIG. 7A. In this Figure, 12 designates a transformer having a high impedance primary winding P and a very low ohmic secondary winding S. The signal to be transmitted to the transducer 1 is shown in FIG. 7A as an alternating voltage generator, connected to the primary winding P.

The very low ohmic secondary winding S is connected to a relatively thick conductor 16, which is mounted in parallel with the path of movement of the transducer 1. The conductor 16 will carry a relatively heavy current, proportional to the signal to be transferred to the transducer 1 and/or the electronic equipment 7. An annular ferrite core 13 is mounted around the conductor 16 and is fixed to move with the transducer 1. As will be appreciated, conductor 16 serves as a primary winding for the ferrite core the core 13. As secondary winding, 13 has a multi-turn winding which is connected to an amplifier 14 which, for example, supplies electrical power to the transducer 1. To obtain a satisfactory signal level of the secondary winding on the ferrite core 13, this can be tuned to resonate with, for example, a capacitor C shown in FIG. 7B. The length of the conductor 16 is adapted to the maximum movement of the transducer/carriage 1 and can be one of the shaft rails 8 or adjacent to a shaft rail 8.

Figure 8:
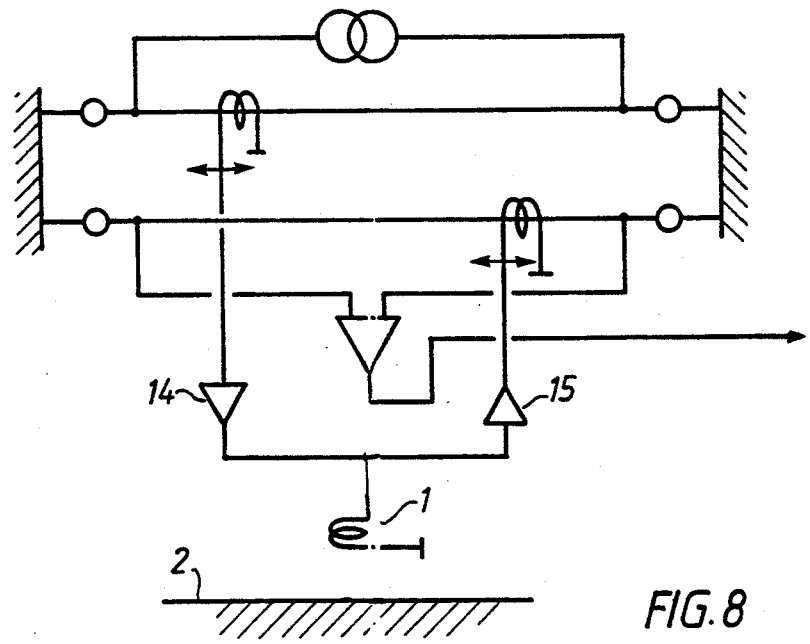
FIG. 8 shows how a bidirectional arrangement can be provided in accordance with the invention.

FIGS. 7A and 7B thus show the basic principle of how the signal transmission can be arranged in accordance with this invention. FIG. 8 shows how the principle can be further developed and can become bidirectional by, for example, doubling the arrangement. FIG. 8 can also be seen as a typical eddy current configuration, suited for use in combination with the U.S. Pat. Nos. 4,646,013, 4,661,777, 4,819,181 and 4,864,235 and the methods and devices disclosed in these patents.

The inductive transmission featured in this invention has thus advanced one step further towards an optimum solution for the design of a transducer manipulator but no mention has yet been made as to how the transducer is to be driven in its motion. Mechanical arrangements for driving a transducer across a hot strand are subjected to great stresses. One way of avoiding this problem is to allow the mobile transducer to pass as a shuttle across the test object.

An elegant solution in this connection is to push away the transducer, by means of compressed air, at the ends of the motion path of the transducer and then, when the transducer/carriage has gathered sufficient kinetic energy to allow the transducer to move by itself along its motion path across the surface of the object 2 and to retard it in a corresponding way by means of air at the opposite end of its path. In this way, the need for chains and belts and the like across the test object is completely eliminated. What remains for the transducer/carriage to carry with it is now a cooling water hose. By draining the water supplied on to the object 2, the length of the hose or tube can be minimized since a return link is not required. In those cases where electronic equipment 7 is required adjacent to the transducer 1, it will be necessary to have either a battery, which can be placed on the carriage, or an external current supply. The latter can be obtained by means of, for example, the shaft rails 8 and the bearings 9.

The performance of the signal transmission may in certain applications be improved if one transmission is reserved for each frequency used, for example for each carrier frequency in connection with eddy current testing.

The drawings show applications where the path of movement of the transducer is linear. However, there is nothing preventing the invention being applied to transducers having a curved scanning path.

Signal transmission equipment may, for example, be mounted inside the lower chamber 3, thus being well protected against external damage.

By the direction of movement is meant here, in most cases, the direction of movement of the carriage (e.g. the housing 24). The transducer 1 may have superimposed movements which allow the transducer instantaneously to have a deviating direction of movement, which is of no interest in this connection.

The invention makes possible the following preferred design features.

- The transducer 1 moves across the test object 2 with no means of propulsion other than its kinetic energy.
- The signal transmission is performed in a contactless manner by means of inductive coupling.
- The current supply is performed by means of the wheels and/or bearings/bearing guide rails of the transducer carriage.
- Cooling water is transferred by means of a flexible hose (e.g. disposed in an articulated tubular arm extending from a center line of the object 2).
- The device is self-adjusting as regards the distance of the transducer 1 to the surface of the test object 2, by means of a device (11) supported against the surface of the test object.
- Kinetic energy is transmitted to the transducer/carriage by means of impulses, for example compressed air impulses.

The invention can be varied in many ways within the scope and spirit of the appended claims.

What is claimed is:

1. In monitoring equipment in which a transducer moves along a path relative to a manipulator over a test object and signals therefrom are transmitted between the transducer and a circuit, for example in equipment for detecting surface cracks in hot steel blanks, the improvement of providing at least one conductor, oriented along the direction of movement of the transducer along the path of movement thereof and at least one ferrite core fixed to the transducer and surrounding said conductor, for example as sub-devices in a transformer, the ferrite coupling the movable transducer to said circuit by transformer coupling.

2. Equipment according to claim 1, wherein the movable transducer consists of an eddy-current based surface transducer.

3. Equipment according to claim 1, wherein the transducer is embodied in a movable carriage and said carriage moves across the test object as a shuttle, at least partially by its own kinetic energy, and that kinetic energy is transmitted to the shuttle via impulses near the ends of the path of movement.

4. Equipment according to claim 1, wherein at least a part of the transformer-coupled, transmitted signal is tuned to resonate with a carrier frequency.

5. Equipment according to claim 4, wherein one transformer coupling is used per carrier frequency.

6. Equipment according to claim 1, wherein a mobile carriage moves along a conducting shaft, and said shaft is at least partially surrounded by a water-cooled chamber.

7. Equipment according to claim 6, wherein the supply of at least one of current, voltage and signals is performed by means of a bearing of the carriage on its supporting shaft.

8. Equipment according to claim 6, wherein the carriage is placed between two supporting shaft rails.

9. Equipment according to claim 1, wherein the distance between the transducer and the surface of the test object is adjusted by means of an eccentric device.

* * * * *